(12) United States Patent
Smith et al.

(10) Patent No.: US 9,488,290 B2
(45) Date of Patent: Nov. 8, 2016

(54) DISC CHECK VALVE SYSTEM AND METHOD

(71) Applicant: Prince Industries, Inc., Carol Stream, IL (US)

(72) Inventors: David Paul Smith, Wilmington, IL (US); Kevin P. Stamper, Belvidere, IL (US)

(73) Assignee: Prince Industries, Inc., Carol Stream, IL (US)

( * ) Notice: Subject to any disclaimer, the term of this patent is extended or adjusted under 35 U.S.C. 154(b) by 147 days.

(21) Appl. No.: 14/582,512

(22) Filed: Dec. 24, 2014

(65) Prior Publication Data

US 2016/0186872 A1   Jun. 30, 2016

(51) Int. Cl.
*F16K 15/02* (2006.01)
*F16K 1/32* (2006.01)

(52) U.S. Cl.
CPC .............. *F16K 15/02* (2013.01); *F16K 1/32* (2013.01); *F16K 15/025* (2013.01)

(58) Field of Classification Search
CPC ......... F16K 15/025; F16K 1/32; F16K 15/02
USPC ........................................ 137/528, 538, 540
See application file for complete search history.

(56) References Cited

U.S. PATENT DOCUMENTS

| | | |
|---|---|---|
| 4,129,144 A | 12/1978 | Andersson et al. |
| 4,971,093 A | 11/1990 | Andersson |
| 6,581,633 B2 | 6/2003 | Andersson |
| 7,293,579 B2 | 11/2007 | Aardema et al. |
| 2011/0162732 A1* | 7/2011 | Biel ............... F16K 15/026 137/538 |

* cited by examiner

*Primary Examiner* — Kevin Lee
*Assistant Examiner* — P. Macade Nichols
(74) *Attorney, Agent, or Firm* — Barich IP Law Group

(57) ABSTRACT

A system and method for a check valve system is provided including a plurality of interlocking guide plates that are inserted into a guide plate retainer in order to maintain their relative position to one another. A retainer nut is positioned to structurally engage the guide plates. An insert adapter receives a check valve to open and close the valve. A threaded screw engages both the check valve and the retainer nut to form the check valve system. A valve spring is positioned between the guide plate retainer and the insert adapter to bias the check valve into a closed position and to maintain a closed position as desired. The check valve system provides a low mass solution the reduces initial pressure overshoot and instability oscillations as well as providing a good flow path for fluid and high capability for back pressure.

17 Claims, 16 Drawing Sheets

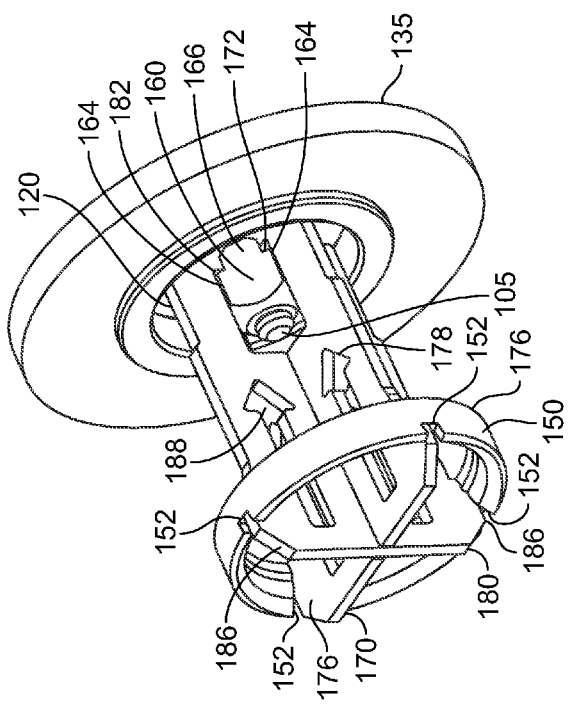
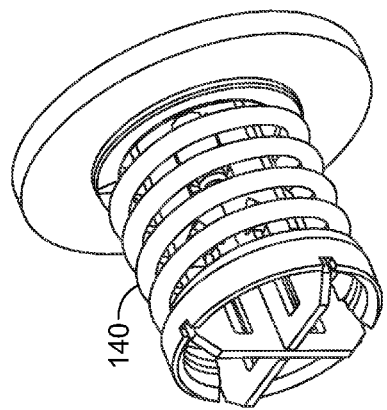
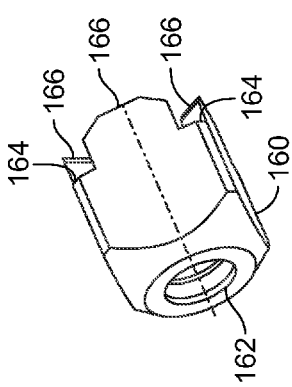

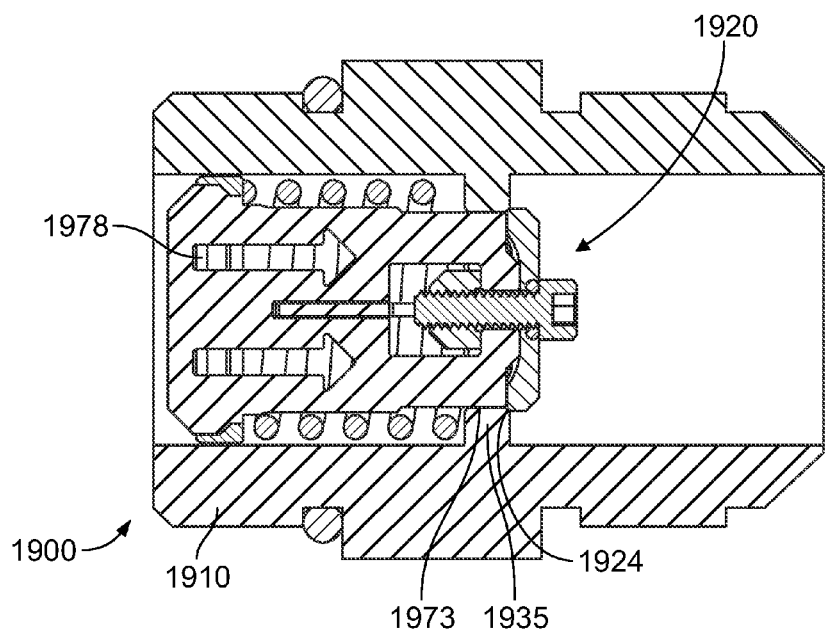
FIG. 19
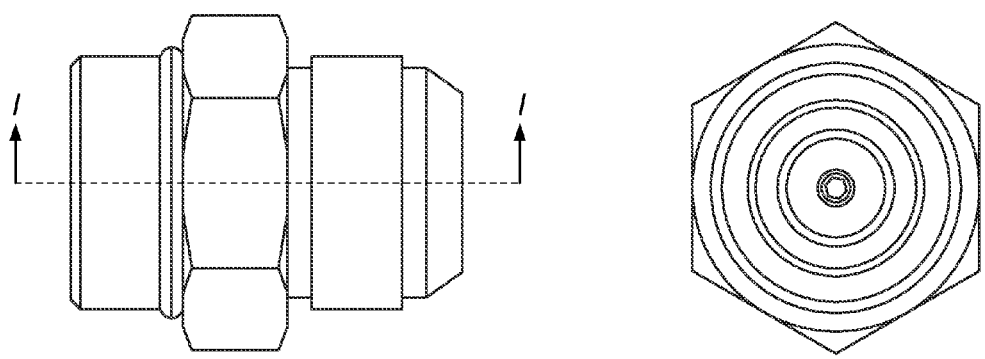
FIG. 20  FIG. 21

DISC CHECK VALVE SYSTEM AND METHOD

BACKGROUND OF THE INVENTION

One or more of the embodiments of the present invention provide check valves. More particularly, one or more embodiments of the present invention relate to check valves for use in a hydraulics system.

Check valves are known in the applied hydraulics industries to generate a predetermined restriction in the main flow direction and prevent or limit flow in the opposite direction. Most hydraulics circuits use various check valves.

Many check valve systems are present in the prior art, such as those shown in U.S. Pat. Nos. 7,293,579 and 6,581,633, which are further discussed below.

BRIEF SUMMARY OF THE INVENTION

One or more embodiments of the present invention provide an improved check valve system having low mass that reduces initial pressure overshoot and instability oscillations as well as provides a good flow path for fluid and is capable of high back pressure. The check valve system includes a plurality of interlocking guide plates that are inserted into a guide plate retainer in order to maintain their relative position to one another. A retainer nut is positioned to structurally engage the guide plates. An insert adapter receives a check valve to open and close the valve. A threaded screw engages both the check valve and the retainer nut to form the check valve system. A valve spring is positioned between the guide plate retainer and the insert adapter to bias the check valve into a closed position and to maintain a closed position as desired.

BRIEF DESCRIPTION OF THE DRAWINGS

FIG. 2 illustrates an enlarged view of the retainer nut.

FIG. 3 illustrates an isometric view of the disc check valve system as assembled without the valve spring.

FIG. 4 illustrates the same isometric view of the disc check valve system shown in FIG. 3, but with the valve spring in place.

FIG. 19 illustrates a side cut-away view of exemplary embodiment of the disc check valve system positioned in a 37 degree flare-style connection fitting in an integral configuration of the connection fitting operating as a check valve for fluid flowing out of the connection fitting.

FIG. 20 illustrates a side view of the embodiment of FIG. 19.

FIG. 21 illustrates a front view of the embodiment of FIG. 19.

DETAILED DESCRIPTION OF THE INVENTION

Figure 1:
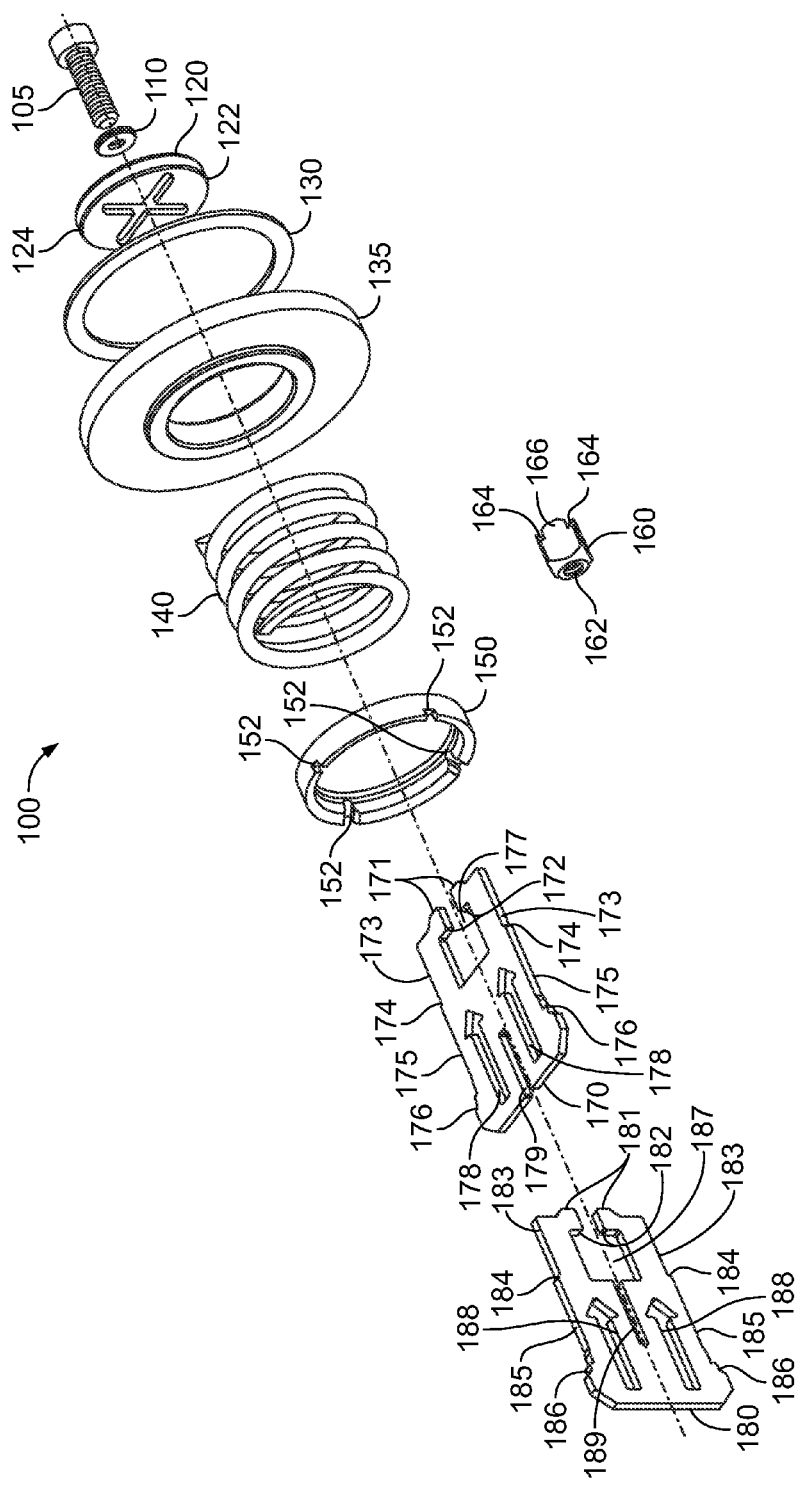
FIG. 1 illustrates a disc check valve system according to an embodiment of the present invention.

Low mass check valves such as those shown in U.S. Pat. No. 7,293,579 improve circuit stability by raising the natural frequency of the low mass check on a predetermined spring. The low mass may reduce initial pressure overshoot magnitude and the number of pressure instability oscillations. Typically the back pressure rating on these low mass check valves is limited by the lower strength of the light weight material used for the low mass (such as aluminum of thermal plastic). Other times the overall cost of the low mass check is high due to the higher price of high strength light-weight materials used such as titanium. The low mass check cost may also be high due to the cost of machining or investment casting the guide legs needed to prevent binding.

Still other more conventional check valve poppets have flow path holes or notches that may be too restrictive for some applications and have too high of mass for some applications. The space needed for the guide mechanism require that the check valve include a body or fitting which again adds to the installation costs.

Still other disc or flat plate style checks do not offer a force bias element and then do not offer the predetermined main flow restriction needed in some applications.

Other check valves as shown in U.S. Pat. No. 6,581,633 has a spring bias force placed upstream of the main flow direction but the guide legs contact the aperture opening with rounded corners or a center line contact. Rounding the edges of the legs prevents the legs from being made from stamped plates which adds cost or significantly lowers the cracking pressure. Also the check valve shown has an elastomer rubber disc that requires a support head mechanism and limits the check valves back pressure capability.

One or more embodiments of the present invention address the above concerns by placing the force bias spring upstream of the disc check element. This spring load then pulls on the disc check element instead of pushes. This pulling or tension bias force tends to center the disc without the need for much guiding structure.

By eliminating the typical push buckling loads the guide mechanism may be much lower mass. This guide mass reduction allows the disc to be made of conventional materials such as steel. The high strength disc may then withstand high back pressure.

Additionally, the disc may be curved to increase the strength and lower the overall mass. Also, the sealing surface may use flat face abutment, radial to conical and mismatched conical angles known to control back pressure leakage.

The guide plates may also be aligned and held in place by a ring on one end and slots in the disc on the other end.

The spring retainer guide plate sub assembly may be held together by a single fastener.

Alternatively, the spring retainer guide plates may also be a one piece molded cage. However, a molded plastic guide cage has lower tensile strength than steel and may limit the spring pre-load. Additionally, a one-piece molded metal cage may be more expensive.

The ring retainer on one end may be out of a low friction bearing material (such as bronze). The ring retainer may also snap into place such that low bias force compression springs may be configured without the ring coming loose during check valve actuations.

The guide plates may be designed to limit the disc check full open stroke.

The main flow direction may be stamped into or onto the plates for ease of flow path identification.

The spring loads on these guide plates is in tension so the extra stamped arrows do not lower the expected durability life.

This style of disc check may be configured without a fitting nor housing nor body. In other words, the lack of check element guiding forces needed allow this check to be inserted into typical lines and fittings and bodies.

FIG. 1 illustrates a disc check valve system 100 according to an embodiment of the present invention. The disc check valve system 100 includes a threaded screw 105, a screw seal 110, a disc check valve 120, a seal 130, an insert adapter 135, a valve spring 140, a disc check valve guide plate retainer 150, a retainer nut 160, a first disc check valve guide plate 170, and a second disc check valve guide plate 180.

The disc check valve 120 includes a plurality of guide plate engagement slots 122 and an adapter contact surface 124.

The first disc check valve guide plate 170 includes two first guide plate disc engagement tabs 171 that engage with two of the plurality of guide plate engagement slots 122 of the disc check valve 120. The first disc check valve guide plate 170 also includes two first guide plate retainer nut end engagement surfaces 172 and two first guide plate to adapter opening engagement surfaces 173. Additionally, the first disc check valve guide plate 170 includes two first guide plate max stroke contact surfaces 174, two first guide plate spring guide surfaces 175, two first guide plate retainer engagement tabs 176, a first guide plate retainer nut aperture 177, two first guide plate flow directional indicators 178, and a second disc check valve guide plate engagement slot 179.

Similarly, second disc check valve guide plate 180 includes two second guide plate disc engagement tabs 181 that engage with two of the plurality of guide plate engagement slots 122 of the disc check valve 120. The second disc check valve guide plate 180 also includes two second guide plate retainer nut end engagement surfaces 182 and two second guide plate to adapter opening engagement surfaces 183. Additionally, the second disc check valve guide plate 180 includes two second guide plate max stroke contact surfaces 184, two second guide plate spring guide surfaces 185, a two second guide plate retainer engagement tabs 186, a second guide plate retainer nut aperture 187 two second guide plate flow directional indicators 188, and a first disc check valve guide plate engagement slot 189.

The retainer nut 160 includes a retainer nut thread 162 for receiving the threads of the threaded screw 105, as well as four retainer nut slots 164 and four retainer nut positioning tabs 166.

The disc check valve guide plate retainer 150 includes four guide plate slots 152 for receiving the retainer engagement tabs 176, 186 of the first disc check valve guide plate 170 and second disc check valve guide plate 180.

To assemble the disc check valve system 100, the second disc check valve guide plate engagement slot 179 of the first disc check valve guide plate 170 is inserted into the first disc check valve guide plate engagement slot 189 of the second disc check valve guide plate 180.

The retainer nut 160 is then introduced into the first guide plate retainer nut aperture 177 and second guide plate retainer nut aperture 187. The four retainer nut slots 164 are then positioned proximal to or in contact with the two first guide plate retainer nut chamfer engagement surfaces 172 two second guide plate retainer nut chamfer engagement surfaces 182. Additionally, the four retainer nut positioning tabs 166 are positioned between sequential surfaces of the first disc check valve guide plate 170 and second disc check valve guide plate 180 in order to provide support for the rigidity of the preferably right-angle spacing of the guide plates 170, 180.

Next, the disc check valve guide plate retainer 150 is positioned around the first disc check valve guide plate 170 and second disc check valve guide plate 180. Then, the two first guide plate retainer engagement tabs 176 and two second guide plate retainer engagement tabs 186 are introduced into the four guide plate slots 152 of the disc check valve guide plate retainer 150. The guide plate retainer 150 also provides support for the rigidity of the preferably right-angle positioning of the guide plates 170, 180.

Then, the valve spring 140 is positioned around the first disc check valve guide plate 170 on surface 175 and second disc check valve guide plate 180 on surface 185 and the entire assembly is positioned proximally to the insert adapter 135 such that surfaces 173 and 183 enter the aperture inside diameter opening of the insert adapter 135

On the opposite side of the insert adapter 135, the threaded screw 105 is inserted through the screw seal 110, the disc check valve 120, the seal 130, and the insert adapter 135. The threads of the threaded screw 105 are then engaged with the retainer nut thread 162. As the threaded screw 105 is tightened, the retainer nut 160 is brought into contact with the two first guide plate retainer nut end engagement surfaces 172 and two second guide plate retainer nut end engagement surfaces 182. Additionally, the two first guide plate disc engagement tabs 171 and two second guide plate disc engagement tabs 181 are introduced into the guide plate engagement slots 122 of the disc check valve 120, which further provides support for the rigidity of the preferably right-angle spacing of the guide plates. 170, 180.

Once the threaded screw 105 is completely engaged and tightened to a predetermined torque with the retainer nut thread 162, assembly of the disc check valve system 100 is complete. One example of such a predetermined torque is 0.5+/−0.1 N/m. A thread locker provision such as Loctite or other known thread locker known in the fastener art may be used to prevent thread loosening.

FIG. 2 illustrates an enlarged view of the retainer nut 160. In FIG. 2, the retainer nut thread 162 for receiving the threads of the threaded screw 105, two of the four retainer nut slots 164, and three of the four retainer nut positioning tabs 166 may be seen. The remaining retainer nut slots and retainer nut positioning tab are positioned uniformly around the exterior of the retainer nut 160.

FIG. 3 illustrates an isometric view of the disc check valve system 100 as assembled without the valve spring 140. As shown in FIG. 3, the disc check valve guide plate retainer 150 has been positioned around the first disc check valve guide plate 170 and second disc check valve guide plate 180. The two first guide plate retainer engagement tabs 176 and two second guide plate retainer engagement tabs 186 have been introduced into the four guide plate slots 152 of the disc check valve guide plate retainer 150.

Additionally, the retainer nut 160 has been positioned inside the first guide plate retainer nut aperture 177 and second guide plate retainer nut aperture 187. The four retainer nut chamfers 164 have been positioned proximal to or in contact with the two first guide plate retainer nut engagement surfaces 172 and the two second guide plate retainer nut chamfer engagement surfaces 182. Additionally, the four retainer nut positioning tabs 166 have been positioned between sequential surfaces of the first disc check valve guide plate 170 and second disc check valve guide plate 180.

The above assembled components have been introduced through the insert adapter 135 inside diameter aperture opening and are in contact with the disc check valve 120, a small portion of which may be seen. Additionally, in the current embodiment, the bottom portion of the threaded screw 105 may be seen as it extends out of the retainer nut thread 162 of the retainer nut 160. The first guide plate flow directional indicators 178 and second guide plate flow directional indicators 188 may also be seen.

FIG. 4 illustrates the same isometric view of the disc check valve system 100 shown in FIG. 3, but with the valve spring 140 in place. Note that some check valve application may include the spring 140 and some may not include the spring. For example, the spring 140 may be absent in an embodiment when just the back pressure of the fluid is used to close the valve. Also the spring 140 preload and rate may vary for various check valve cracking pressure requirements.

Figure 5:
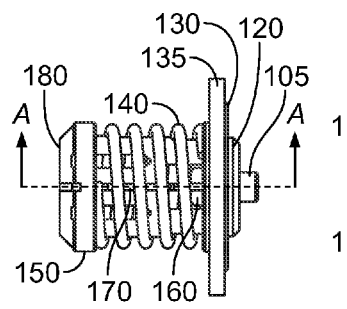
FIG. 5 illustrates a side view of the disc check valve system in its shut position.

FIG. 5 illustrates a side view of the disc check valve system 100 in its shut position. Observable features include the threaded screw 105, disc check valve 120, seal 130, insert adapter 135, valve spring 140, disc check valve guide plate retainer 150, retainer nut 160, first disc check valve guide plate 170, and second disc check valve guide plate 180.

Figure 6:
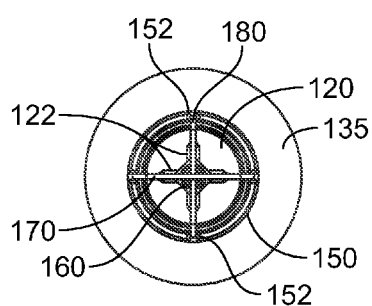
FIG. 6 illustrates a rear view of the disc check valve system looking in the direction of flow.

FIG. 6 illustrates a rear view of the disc check valve system 100 looking in the direction of flow. Observable features include the disc check valve 120, insert adapter 135, disc check valve guide plate retainer plate 180. The engagement slots 122 in disc check valve 120 may have edge chamfers and the engagements slots 152 in the retainer 150 may also have edge chamfers to assist in alignment of the guide plates 170 and 180 during assembly. As seen in FIG. 2 the four slots 164 in nut 160 may also have edge chamfers to assist ease of assembly of the disc check valve system 100.

Figure 7:
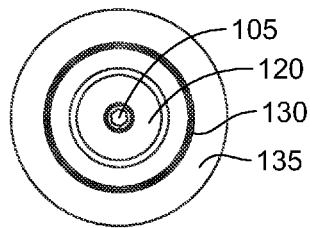
FIG. 7 illustrates a front view of the disc check valve system looking opposite the direction of flow.

FIG. 7 illustrates a front view of the disc check valve system 100 looking opposite the direction of flow. Observable features include the threaded screw 105, the disc check valve 120, seal 130, and the insert adapter 135. The seal 130 may be removed from adapter 135 for service and/or repair.

Figure 8:
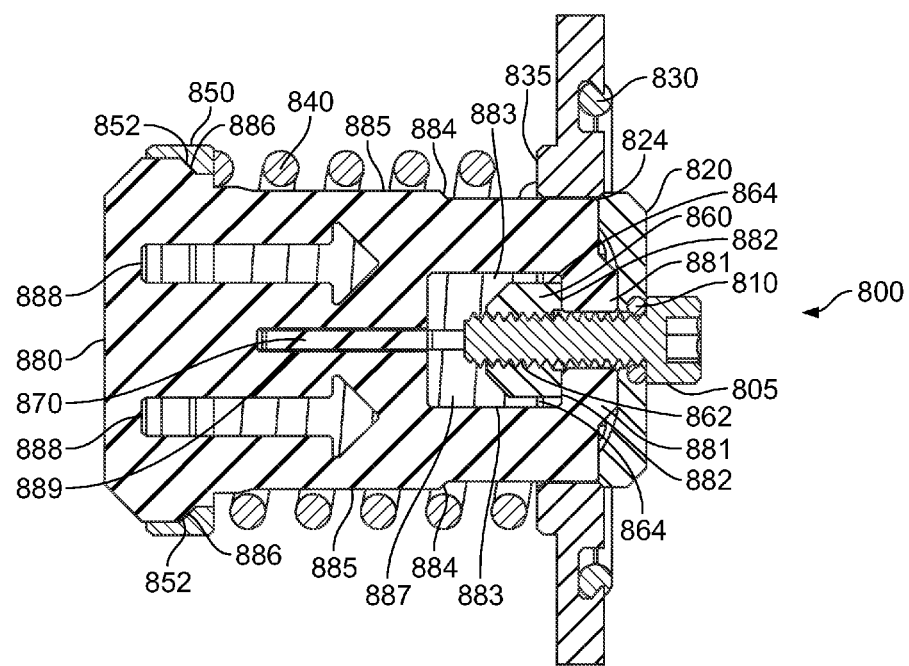
FIG. 8 illustrates a cut-away view of the side view of the disc check valve system in its shut position of FIG. 5.

FIG. 8 illustrates a cut-away view of the side view of the disc check valve system 800 in its shut position of FIG. 5. Observable features shown in FIG. 8 include the threaded screw 805, screw seal 810, disc check valve 820, seal 830, insert adapter 835, valve spring 840, disc check valve guide plate retainer 850, retainer nut 860, first disc check valve guide plate 870, and second disc check valve guide plate 880.

Additionally, an adapter contact surface 824 is shown where the disc check valve 820 contacts the insert adapter 835. The second disc check valve guide plate 880 includes two second guide plate disc engagement tabs 881 that engage with two of the plurality of guide plate engagement slots 822 of the disc check valve 820. The two retainer nut end engagement surfaces 882, two second guide plate to adapter 835 inside diameter retainer nut chamfer engagement surfaces 883, two second guide plate max stroke contact surfaces 884, two second guide plate spring guide surfaces 885, two second guide plate retainer engagement tabs 886, second guide plate retainer nut aperture 887, two second guide plate flow directional indicators 888, first disc check valve guide plate engagement slot 889.

In the cut-away view of FIG. 8, little of the first disc check valve guide plate 870 may be observed beyond the illustration that the second disc check valve guide plate engagement slot 879 of the first disc check valve guide plate 870 has engaged the first disc check valve guide plate engagement slot 889 of the second disc check valve guide plate 880.

The retainer nut 860 includes the retainer nut thread 862 receiving the threads of the threaded screw 805, as well as two of the four retainer nut chamfers 864.

The disc check valve guide plate retainer 850 shows two of the four guide plate slots 852 for receiving the retainer engagement tabs 886 of the second disc check valve guide plate 880. As shown in FIG. 8, the guide plate slots 852 include an angled diameter for a snap fit of the retainer guide plate. Additionally, the guide plate slots 850 may be used to align the guide plate.

FIG. 8 illustrates the disc check valve system 800 in the closed position because the adapter contact surface 824 is in contact with the insert adapter 835. Consequently, fluid does not flow through the disc check valve system 800. The contact between the adapter contact surface 824 and the insert adapter 835 may be angled to reduce leakage. In one embodiment, the angle of contact between the adapter contact surface 824 and insert adapter 835 is a mis-matched angle. For example, the insert adapter 835 may be positioned at an angle of 45 degrees and the adapter contact surface 825 may be positioned at an angle of 43 degrees. As another example, this contact surface 824 may have radius or spherical surface contact having another radius or spherical surface of the same or slightly difference size on the adapter 835 to reduce or eliminate back pressure leakage.

FIGS. 9-24 illustrate the disc check valve system 900 of FIGS. 5-8, but in the open position rather than the closed position.

Figures 9, 10, 11:
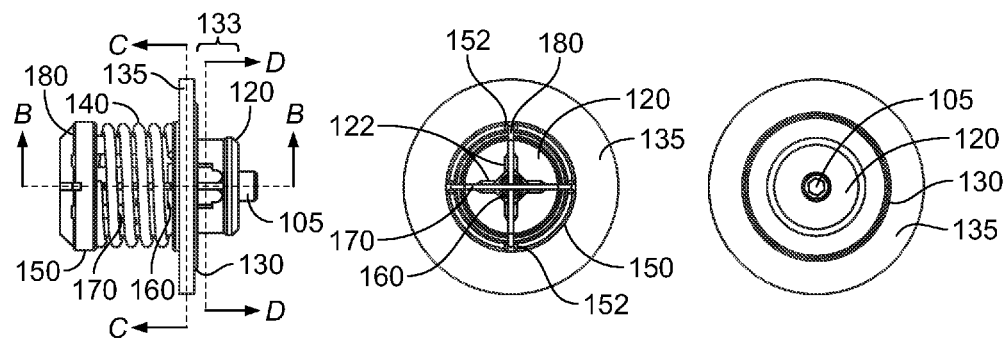
FIG. 9 is similar to FIG. 5 but illustrates a side view of the disc check valve system in its open position.
FIG. 10 is similar to FIG. 6 but illustrates a rear view of the disc check valve system in its open position looking in the direction of flow.
FIG. 11 is similar to FIG. 7 but illustrates a front view of the disc check valve system in its open position looking opposite the direction of flow.

FIG. 9 is similar to FIG. 5 but illustrates a side view of the disc check valve system in its open position. Observable features again include the threaded screw 105, disc check valve 120, seal 130, insert adapter 135, valve spring 140, disc check valve guide plate retainer 150, retainer nut 160, first disc check valve guide plate 170, and second disc check valve guide plate 180.

However, in FIG. 9, the disc check valve 120 may be seen to be displaced outward from and no longer in contact with the insert adapter 135 by a displacement distance 133. The displacement of the disc check valve 120 allows fluid to flow from the rear of the disc check valve 120 through the cylindrical quadrants described the first disc check valve guide plate 170 and second disc check valve guide plate 180. Because the disc check valve 120 has been displaced from the insert adapter 135, the ends of the cylindrical quadrants described the first disc check valve guide plate 170 and second disc check valve guide plate 180 now extend past the insert adapter 135. This allows fluid to flow past the insert adapter 135, around the disc check valve 120, and then continue down a conduit (shown in later figures).

FIG. 10 is similar to FIG. 6 but illustrates a rear view of the disc check valve system 100 in its open position looking in the direction of flow. Observable features include the disc check valve 120, insert adapter 135, disc check valve guide plate retainer 150, retainer nut 160, first disc check valve guide plate 170, and second disc check valve guide plate 180 and slots 122 and 152.

FIG. 11 is similar to FIG. 7 but illustrates a front view of the disc check valve system 100 in its open position looking opposite the direction of flow. Observable features include the threaded screw 105, the disc check valve 120, seal 130, and the insert adapter 135.

Figure 12:
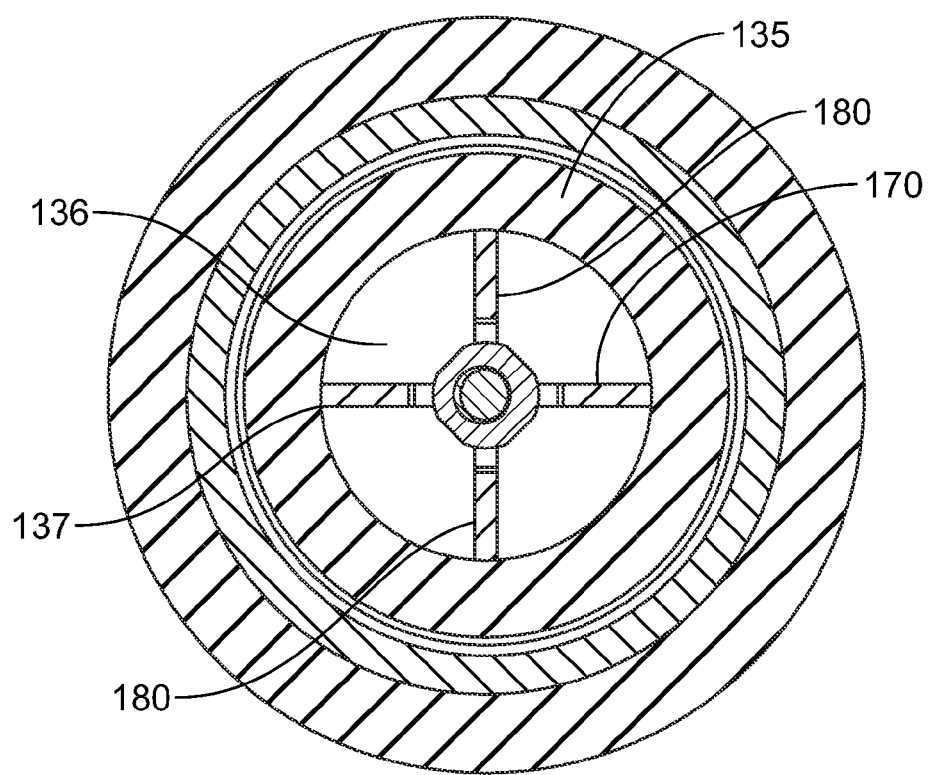
FIG. 12 is a cross-sectional view taken along the axis C-C shown in FIG. 9.

FIG. 12 is a cross-sectional view taken along the axis C-C shown in FIG. 9. FIG. 12 shows the insert adapter 135, first disc check valve guide plate 170 and second disc check valve guide plate 180. FIG. 12 illustrates that with the displacement of the disc check valve 120 from the insert adapter, the aperture of the insert adapter is separated into cylindrical quadrants by the first disc check valve guide plate 170 and second disc check valve guide plate 180 which allows fluid to flow through the insert adapter 135.

Additionally, FIG. 12 shows the controlled diameter aperture area 136 of the insert aperture 135 as well as the preferably flat stamped edges 137 of the guide plates.

Figure 13:
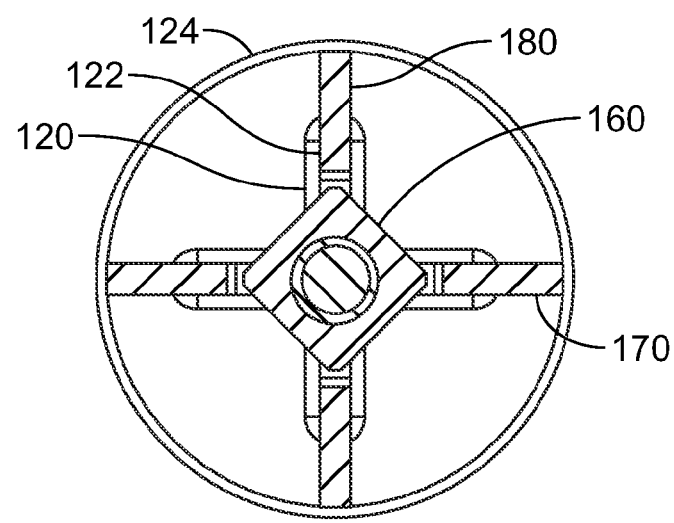
FIG. 13 is a cross-sectional view taken along the axis D-D shown in FIG. 9.

FIG. 13 is a cross-sectional and plan view taken along the axis D-D shown in FIG. 9. FIG. 13 shows the retainer nut 160, the first disc check valve guide plate 170 and the second disc check valve guide plate 180. Additionally, the disc check valve 120 is shown including the plate engagement slots 122, adapter contact surface 124, and a chamfer or radius leading into the plate engagement slots 122 to aid in guiding the first disc check valve guide plate 170 and the second disc check valve guide plate 180 into the plate engagement slots 122 to aid in assembly of the disc check valve 120.

Figure 14:
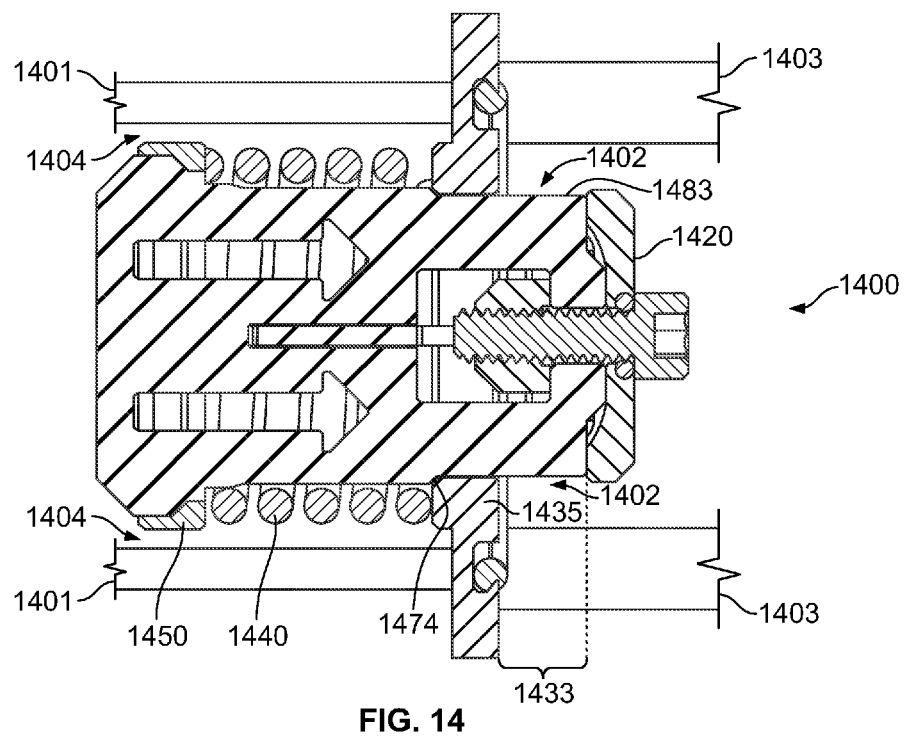
FIG. 14 is similar to FIG. 8, but shows a cut-away view of the side view of the disc check valve system in its open position.

FIG. 14 is similar to FIG. 8, but shows a cut-away view of the side view of the disc check valve system 1400 in its open position. As shown in FIG. 14, the disc check valve 1420 has been displaced away from the insert aperture 1435 by a distance 1433 so that the adapter contact surface 1424 is no longer in contact with the insert aperture 1435. Because of the displacement, the valve spring 1440 has been compressed between the insert adapter 1425 and the disc check valve guide plate retainer 1450.

Additionally, the disc check valve system 1400 is shown in its maximum flow position in FIG. 14 because the guide plate max stroke contact surfaces 1474 have been brought into contact with the insert adapter 1435 and thus prevent the disc check valve 1420 from displacing further from the insert adapter 1435.

As mentioned above, the displacement of the disc check valve 1420 from the insert adapter 1435 creates open areas 1402 allowing fluid to flow through the quadrants described by the first disc check valve guide plate 170 and the second disc check valve guide plate 180, past the insert adapter, and then out and around the disc check valve 1420. Fluid thus passes from an input conduit having input conduit walls 1401 to an output conduit having output conduit walls 1403. The guide plate 1480 is guided at the inside aperture opening in 1435 and the retainer 1450 is guided inside the conduit wall 1401 to form a known clearance shown as 1404. The retainer 1850 may be made from a lower friction bearing material such as bronze to reduce valve plate 1480 and 1470 motion induced friction and wear.

With regard to FIGS. 15-35, three exemplary styles of connection fitting onto which the present disc check valve system may be positioned include: an O-Ring Face Seal (ORFS) style connection fitting, a 37 degree flare-style connection fitting, and a four bolt flange-style connection fitting.

Additionally, the disc check valve system may be inserted into the fitting or may be formed as an integral part of the fitting. When the disc check valve system is inserted into the fitting, the insert adapter may be attached to one end of the fitting or the insert adapter may be positioned proximal to one end of the fitting and then firmly positioned in place by placing a hydraulic tube or hose coupling or other structure over the junction between the insert adapter and the connection fitting. Additionally, the insert adapter may be adapted in shape to conform to the end of the connection fitting.

Alternatively, when the disc check valve system is formed as an integral part of the fitting, an interior portion of the fitting takes the place of the insert adapter and functions similarly to the insert adapter.

Also, the disc check valve system may be positioned to operate as a check valve for fluid entering the connection fitting or as a check valve for fluid exiting the connection fitting.

Additionally, in some embodiments, fluid may encounter the disc check valve system before entering the connection fitting, or may pass through the disc check valve system as the fluid exits the connection fitting. The flow direction arrow indicators aid in the assembly of the disc check valve in the desired flow direction.

Figure 15:
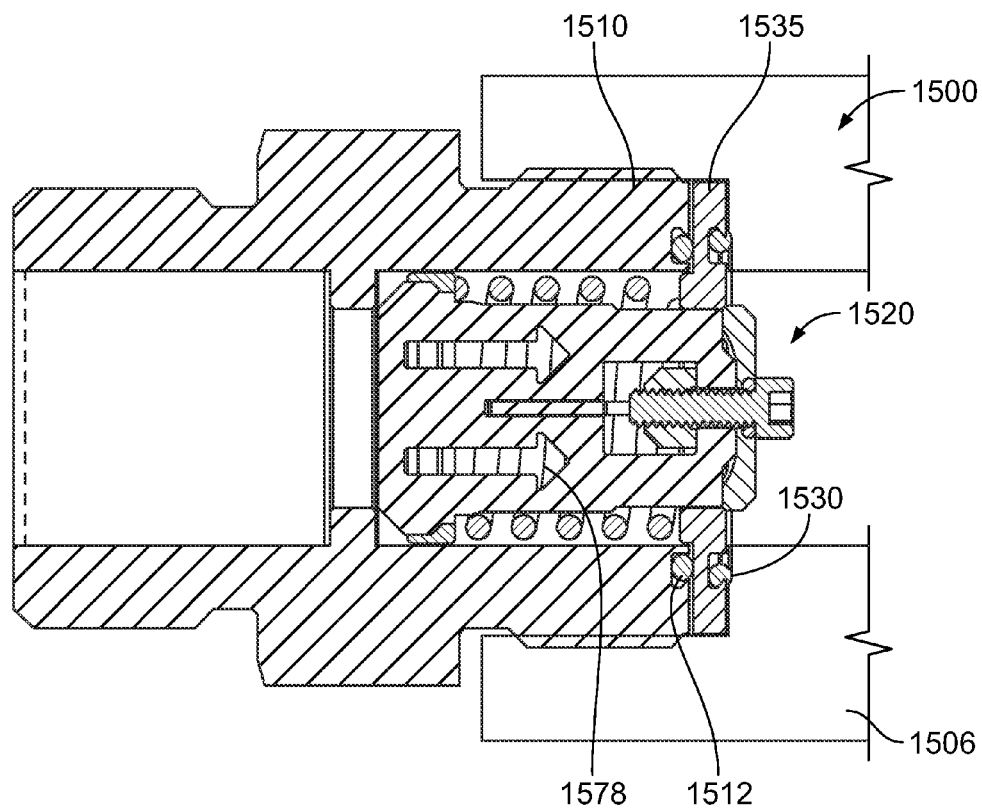
FIG. 15 illustrates a side cut-away view of exemplary embodiment of the disc check valve system positioned in an ORFS-style connection fitting in an inserted configuration at the output of the connection fitting.

FIG. 15 illustrates a side cut-away 1500 view of exemplary embodiment of the disc check valve system 1520 positioned in an ORFS (O-Ring Face Seal)-style connection fitting 1510 in an inserted configuration at the output of the connection fitting. As shown in FIG. 15, the insert adapter 1535 is affixed to the end of the ORFS-style connection fitting 1510. Additionally, circular attachment seal 1512 may be provided to help seal the junction between the insert adapter 1535 and the ORFS-style connection fitting 1510. The insert adapter disc check valve system 1520 is loose until an adjoining hose coupling 1506 is installed and tightened. This then clamps the adapter 1535 into abutment with the fitting 1510 and compresses seals 1512 and 1530. Also, the directional indicators 1578 indicate the direction of flow.

Figure 16:
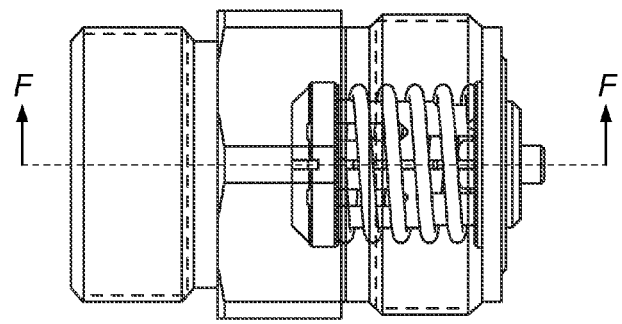
FIG. 16 illustrates a side transparent view of the embodiment of FIG. 15.

FIG. 16 illustrates a side transparent view of fitting 1510 with the insert disc check 1520 installed, of the embodiment of FIG. 15. The hose coupling 1506 is not shown. In FIG. 16, the fitting is transparent so that the insert disc check position may be seen.

Figure 17:
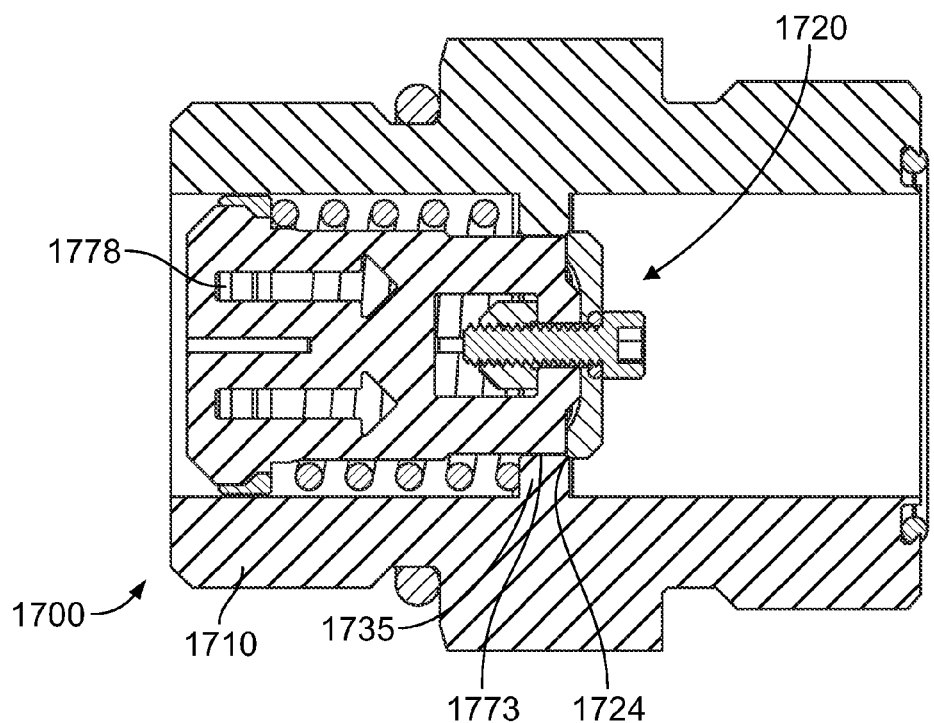
FIG. 17 illustrates a side cut-away view of exemplary embodiment of the disc check valve system positioned in an ORFS-style connection fitting in an integral configuration of the connection fitting.
Figure 18:
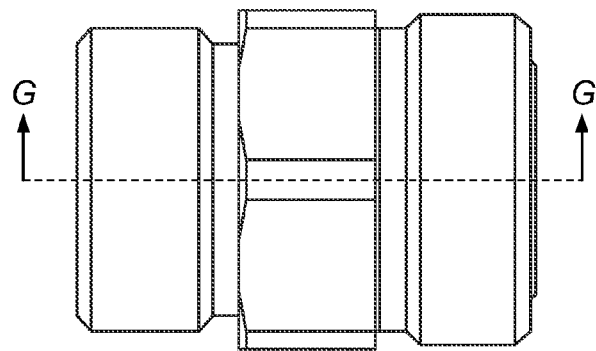
FIG. 18 illustrates a side view of the embodiment of FIG. 17.

FIG. 17 illustrates a side cut-away view 1700 of exemplary embodiment of the disc check valve system positioned in an ORFS-style connection fitting 1710 in an integral configuration of the connection fitting. As shown in FIG. 17, an internal structure 1735 of the connection fitting takes the place of the insert adapter and the disc check valve system 1720 is attached to the internal structure 1735, guided by surfaces 1773, and is held in closed position by the spring load causing abutment of the contact surface 1724 with the fitting 1710. Also, the directional indicators 1778 indicate the direction of flow FIG. 18 illustrates a side view of the embodiment of FIG. 17. The disc valve 1720 is not observable because it is entirely inside the fitting 1710.

FIG. 19 illustrates a side cut-away view 1900 of exemplary embodiment of the disc check valve system positioned in a 37 degree flare-style connection fitting 1910 in an integral configuration of the connection fitting operating as a check valve for fluid flowing out of the connection fitting towards the 37 degree flare end of the fitting. As shown in FIG. 19, an internal structure 1935 of the connection fitting takes the place of the insert adapter and the disc check valve system 1920 is attached to the internal structure 1935, and guided by surfaces 1973 and is held in closed position by the spring load causing abutment of the contact surface 1924 with the fitting 1910. Also, the directional indicators 1978 indicate the direction of flow.

FIG. 20 illustrates a side view of the embodiment of FIG. 19.

FIG. 21 illustrates a front view of the embodiment of FIG. 19.

Figure 22:
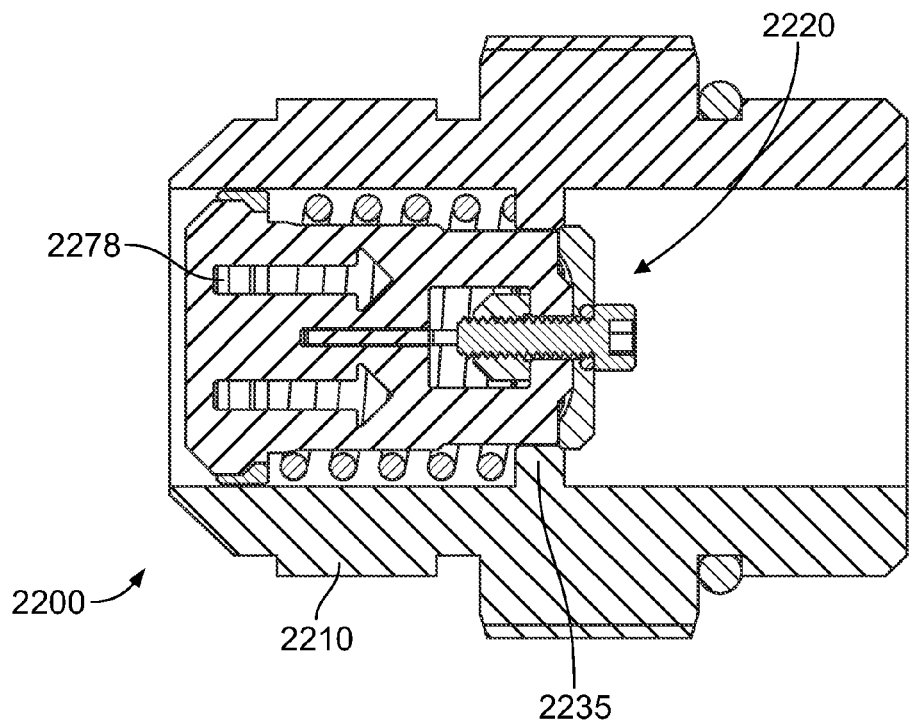
FIG. 22 illustrates a side cut-away view of exemplary embodiment of the disc check valve system positioned in a 37 degree flare-style connection fitting in an integral configuration of the connection fitting operating as a check valve for fluid flowing into the connection fitting.

FIG. 22 illustrates a side cut-away view 2200 of exemplary embodiment of the disc check valve system positioned in a 37 degree flare-style connection fitting 2210 in an integral configuration of the connection fitting operating as a check valve for fluid flowing into the connection fitting away from the 37 degree flared end. As shown in FIG. 22, an internal structure 2235 of the connection fitting takes the place of the insert adapter and the disc check valve system 2220 is attached to the internal structure 2235. Also, the directional indicators 2278 indicate the direction of flow.

Figure 23:
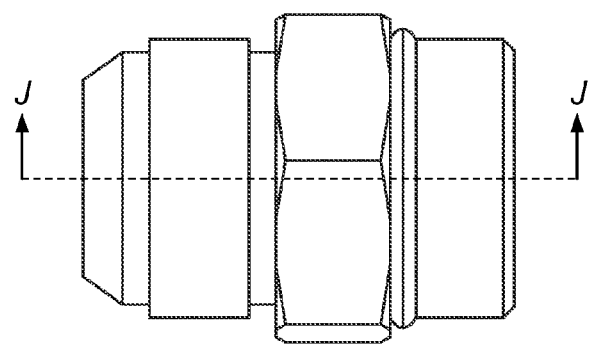
FIG. 23 illustrates a side view of the embodiment of FIG. 22.

FIG. 23 illustrates a side view of the embodiment of FIG. 22.

Figure 24:
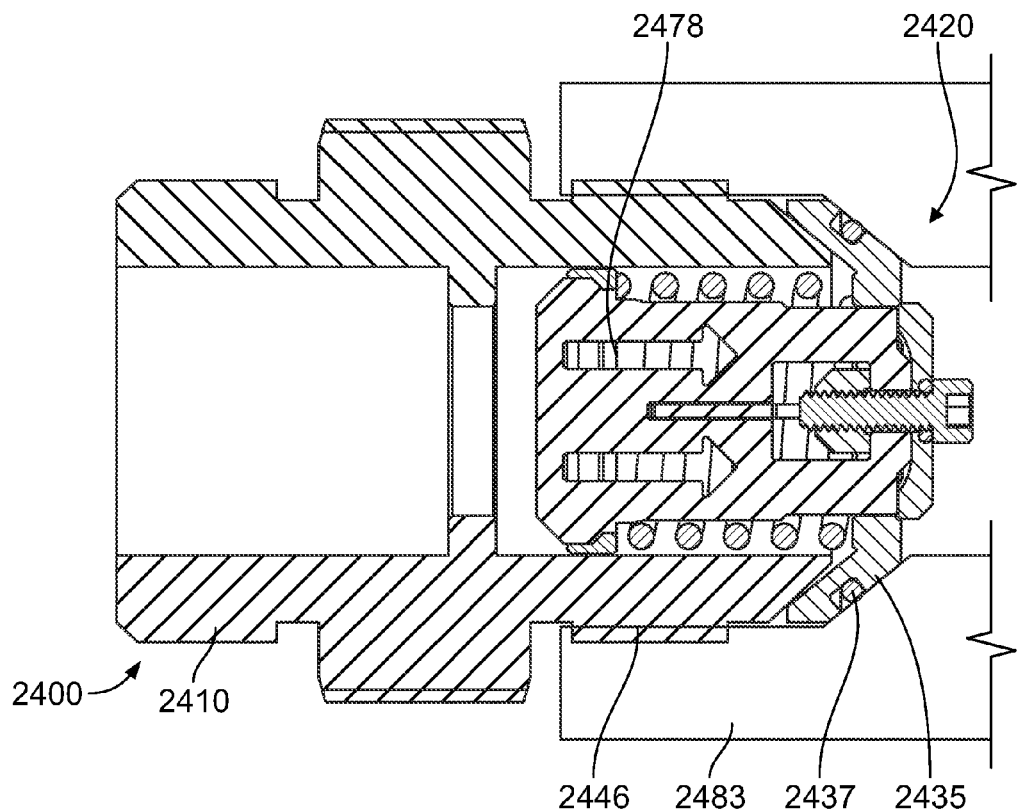
FIG. 24 illustrates a side cut-away view of exemplary embodiment of the disc check valve system positioned in a 37 degree flare-style connection fitting in an inserted configuration of the connection fitting operating as a check valve for fluid flowing out of the connection fitting.

FIG. 24 illustrates a side cut-away view 2400 of exemplary embodiment of the disc check valve system 2420 positioned in a 37 degree flare-style connection fitting 2410 in an inserted configuration of the connection fitting operating as a check valve for fluid flowing out of the connection fitting. As shown in FIG. 24, the insert adapter 2435 is affixed to the end of the 37 degree flare-style connection fitting 2410. It may also be noted that the insert adapter 2435 has been altered in shape to form a cap fitting over the end of the connection fitting 2410. Additionally, the seal 2437 appears on the angled portion of the insert adapter 2410. This seal may be eliminated since the 37 degree flare style fitting is typically a metal to metal type fitting. The insert adapter 2435 and insert disc valve 2420 is typically loose until a hose 2483 of tube coupling is tightened into position using the threaded connection 2446. Also, the directional indicators 2478 indicate the direction of flow.

Figure 25:
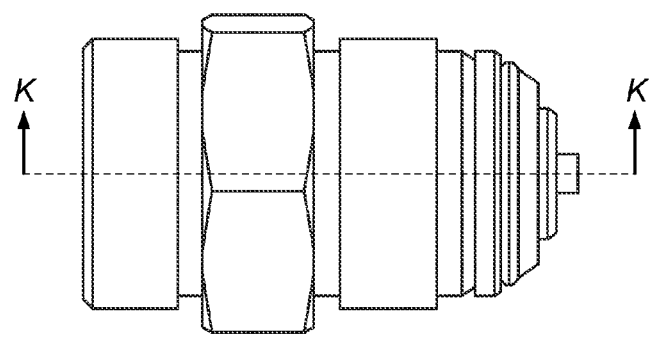
FIG. 25 illustrates a side view of the embodiment of FIG. 24.

FIG. 25 illustrates a side view of the embodiment of FIG. 24. For this flow direction most of the disc check valve 2420 is inside of the fitting 2410.

Figure 26:
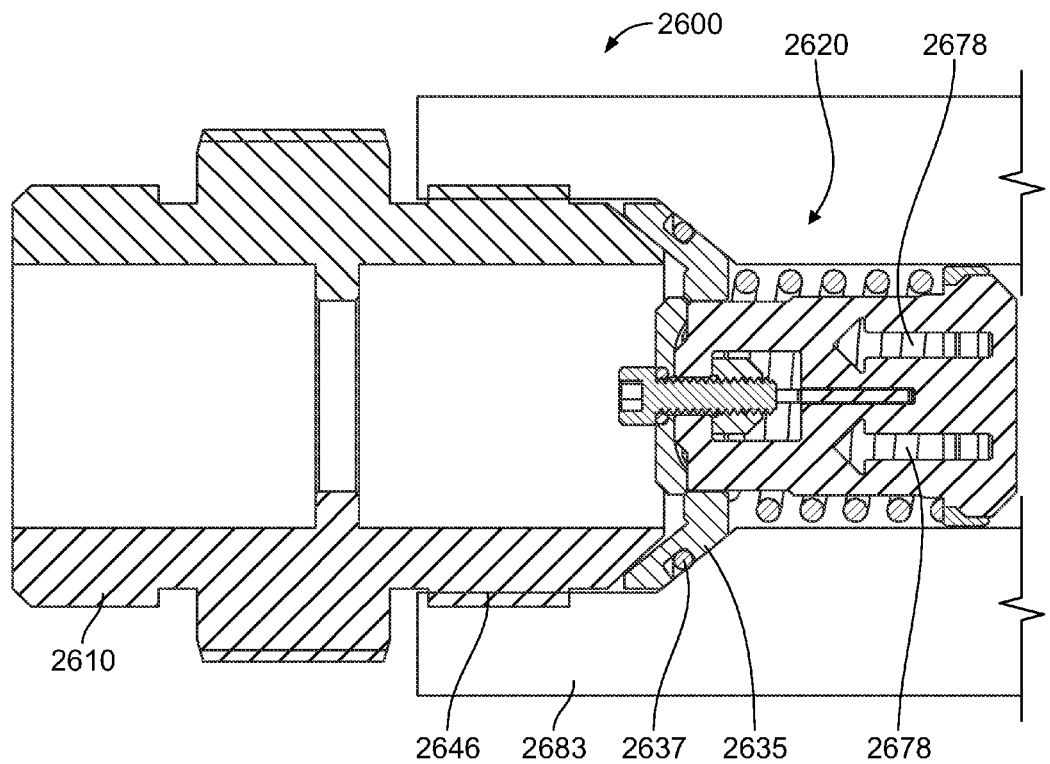
FIG. 26 illustrates a side cut-away view of exemplary embodiment of the disc check valve system positioned in a 37 degree flare-style connection fitting in an inserted configuration of the connection fitting operating as a check valve for fluid flowing into the connection fitting.

FIG. 26 illustrates a side cut-away view 2600 of exemplary embodiment of the disc check valve system 2620 positioned in a 37 degree flare-style connection fitting 2610 in an inserted configuration of the connection fitting operating as a check valve for fluid flowing into the connection fitting. As shown in FIG. 26, the insert adapter 2635 is loosely in contact with the 37 degree flare-style connection fitting 2610 until a hose or tube coupling not shown clamps the adapter 2635 to the 37 degree flare and compresses the seal 2637 (if present) . However, as opposed to FIG. 24, in FIG. 26 the disc check valve system 2620 is positioned ahead of the connection fitting 2610 in the direction of fluid flow away from the 37 degree flare and into the hose or tube 2683 which may be attached using the threaded connection 2646. As in FIG. 24, the insert adapter 2635 has been altered in shape to form a cap fitting over the end of the connection fitting 2610 and flipped 180 degrees on assembly of the disc check valve 2620. Additionally, the seal 2637 (if present) appears on the 37 degree angled portion of the insert adapter 2610. Also, the directional indicators 2678 indicate the direction of flow.

Figure 27:
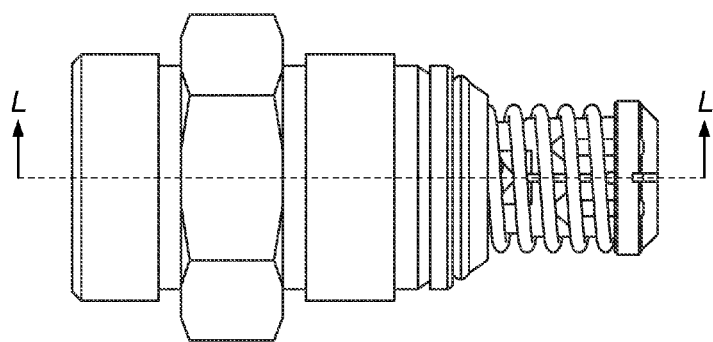
FIG. 27 illustrates a side view of the embodiment of FIG. 26.

FIG. 27 illustrates a side view of the embodiment of FIG. 26. In this case the insert style disc check 2620 is observable, since it is mainly outside of the fitting 2610. The same parts may be used to make insert style disc check valve 2620 as 2420, only the assembly of the adapter 2635 is flipped 180 degrees from the assembly of 2434.

Figure 28:
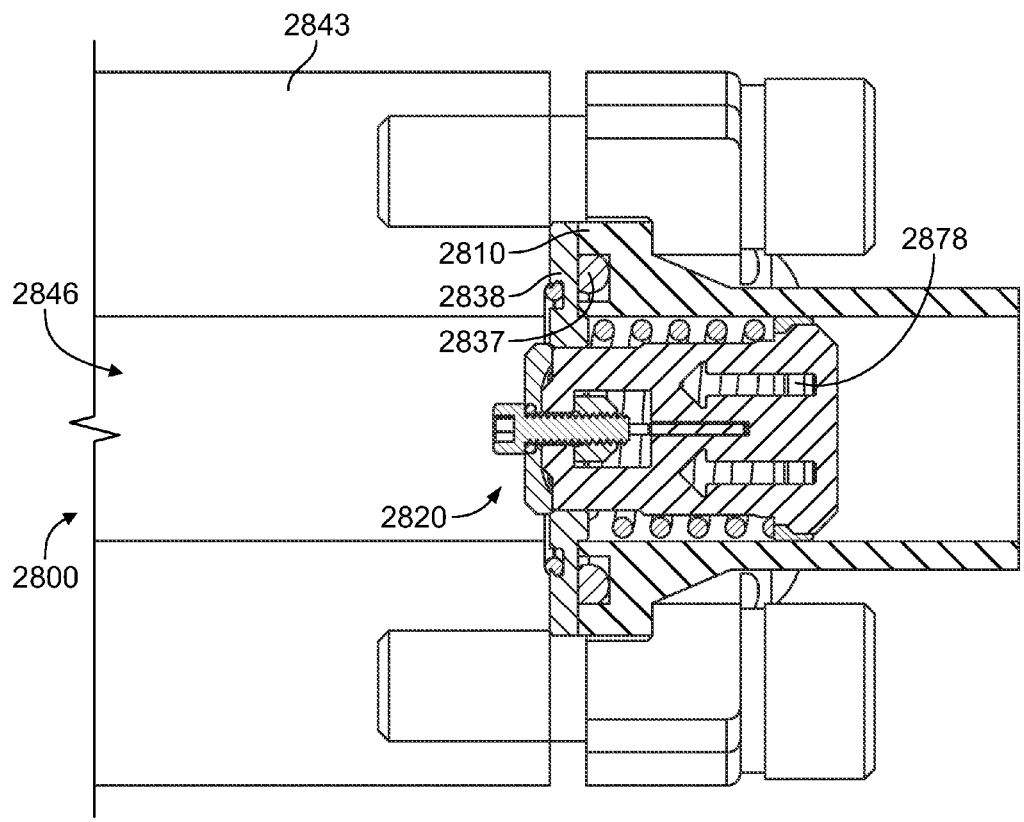
FIG. 28 illustrates a side cut-away view of exemplary embodiment of the disc check valve system positioned in a four bolt flange-style connection fitting in an inserted configuration of the connection fitting operating as a check valve for fluid flowing out of the connection fitting.

FIG. 28 illustrates a side cut-away view 2800 of exemplary embodiment of the disc check valve system 2820 positioned in a four bolt flange-style connection fitting 2810 in an inserted configuration of the connection fitting operating as a check valve for fluid flowing out of the connection fitting. As shown in FIG. 28, the insert adapter 2835 is affixed to the end of the four bolt flange-style connection fitting 2810. This disc valve 2820 and four bolt fitting is usually tightened to a valve body 2843 with an internal passage 2846. Additionally, circular attachment seal 2837 may be provided to help seal the junction between the insert adapter 2835 and the four bolt flange-style connection fitting 2810. Also, the directional indicators 2878 indicate the direction of flow.

Figure 29:
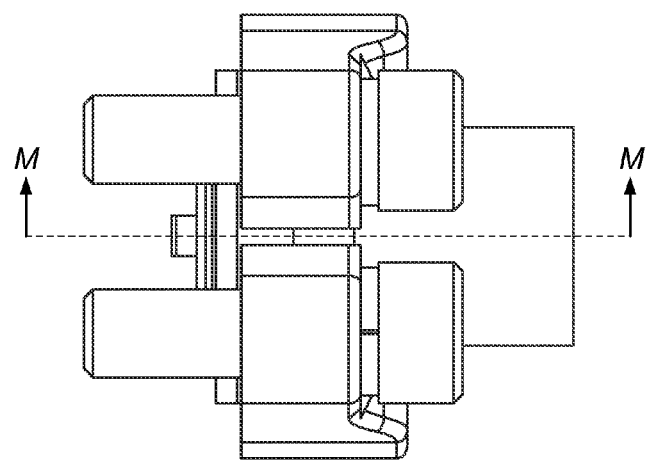
FIG. 29 illustrates a side view of the embodiment of FIG. 28.

FIG. 29 illustrates a side view of the embodiment of FIG. 28.

Figure 30:
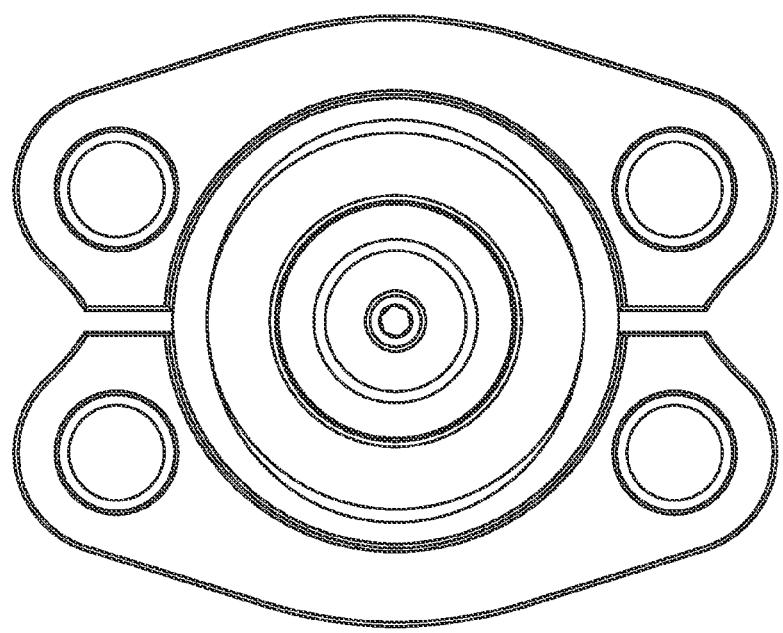
FIG. 30 illustrates a front view of the embodiment of FIG. 28.

FIG. 30 illustrates a front view of the embodiment of FIG. 28.

Figure 31:
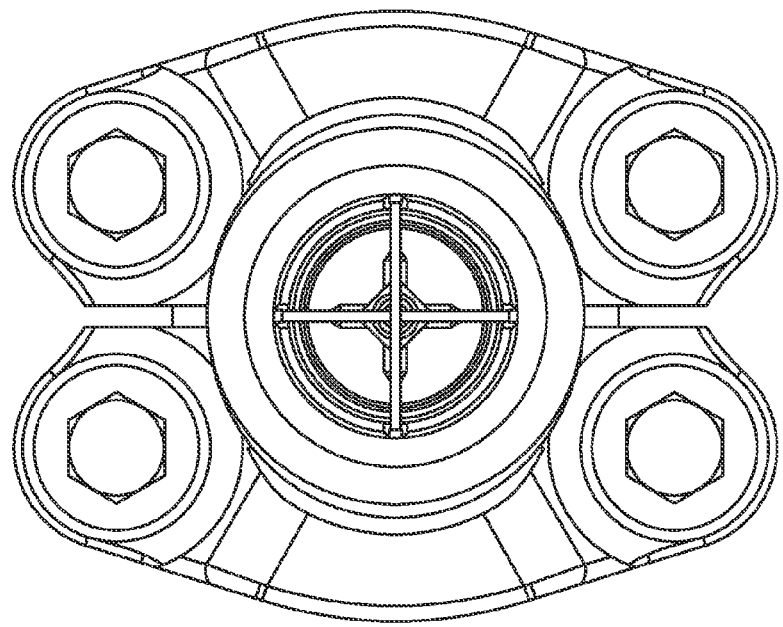
FIG. 31 illustrates a rear view of the embodiment of FIG. 28.

FIG. 31 illustrates a rear view of the embodiment of FIG. 28.

Figure 32:
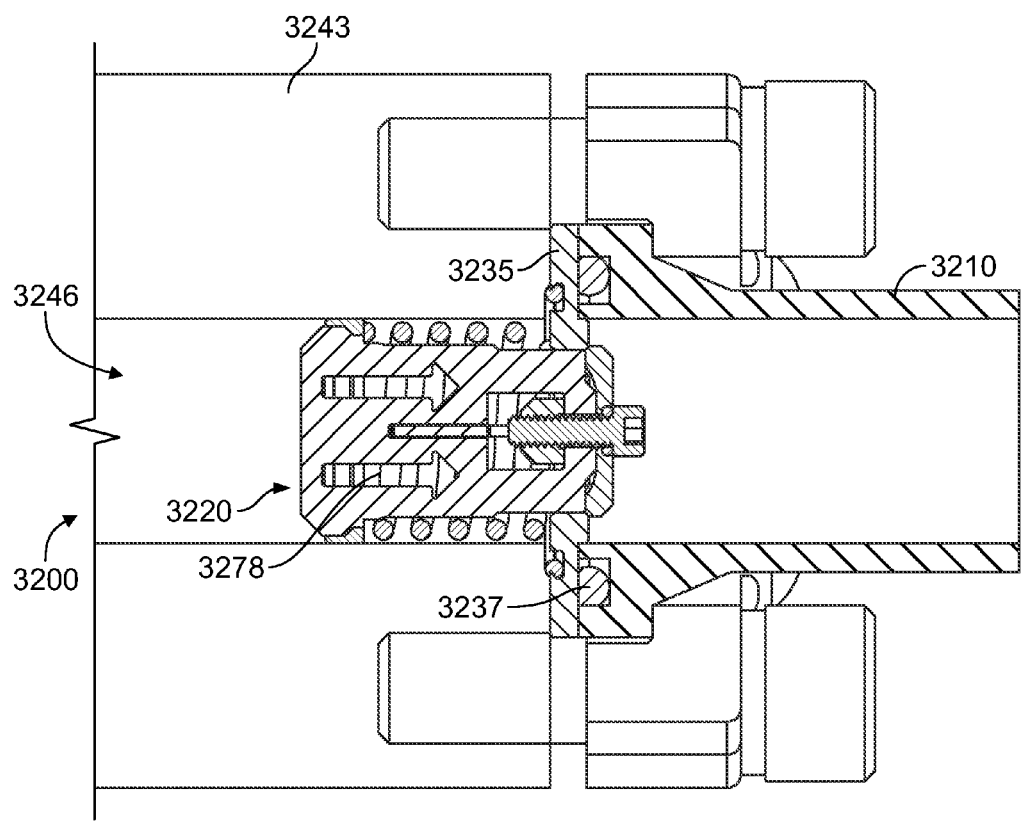
FIG. 32 illustrates a side cut-away view of exemplary embodiment of the disc check valve system positioned in a four bolt flange-style connection fitting in an inserted configuration of the connection fitting operating as a check valve for fluid flowing into the connection fitting.

FIG. 32 illustrates a side cut-away view of exemplary embodiment of the disc check valve system positioned in a four bolt flange-style connection fitting 3200 in an inserted configuration of the connection fitting operating as a check valve for fluid flowing into the connection fitting. Similar to FIG. 28, the insert adapter 3235 is loose until the four bolt fitting 3200 it tightened to a valve manifold 3243 having an internal aperture 3246. However, as opposed to FIG. 28, in FIG. 32 the disc check valve system 3220 is positioned ahead of the connection fitting 3210 in the direction of fluid flow. Additionally, circular attachment seal 3237 may be provided to help seal the junction between the insert adapter 3235 and the four bolt flange-style connection fitting 3210. Also, the directional indicators 3278 indicate the direction of flow.

Figure 33:
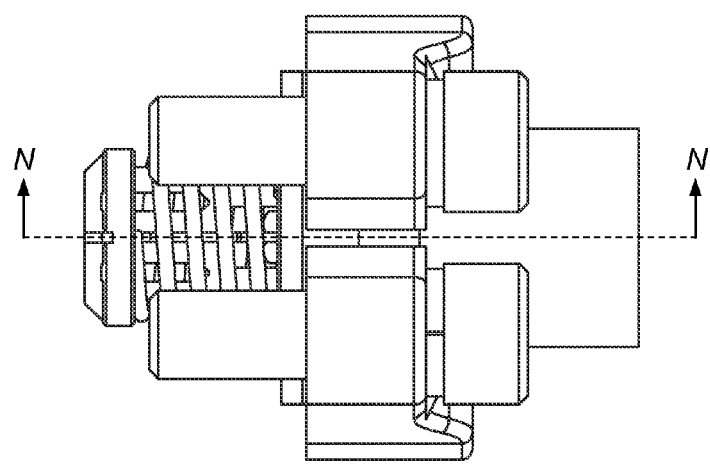
FIG. 33 illustrates a side view of the embodiment of FIG. 32.

FIG. 33 illustrates a side view of the embodiment of FIG. 32.

Figure 34:
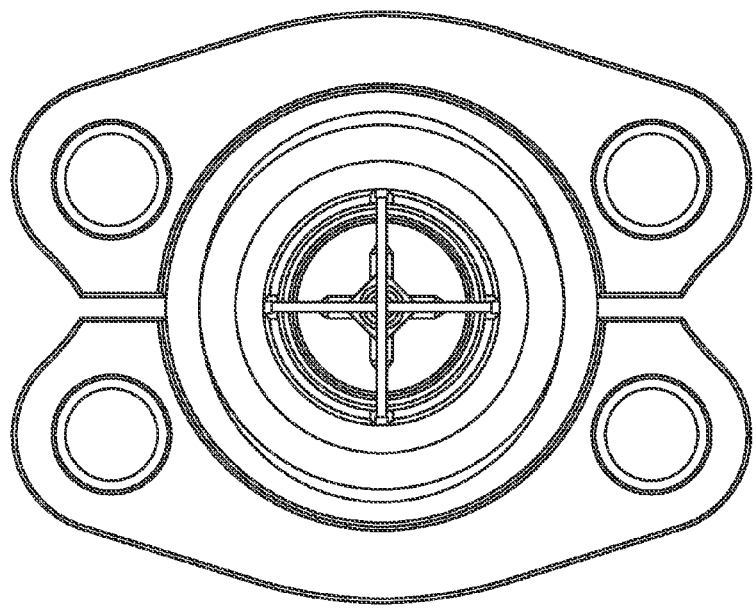
FIG. 34 illustrates a front view of the embodiment of FIG. 32.

FIG. 34 illustrates a front view of the embodiment of FIG. 32.

Figure 35:
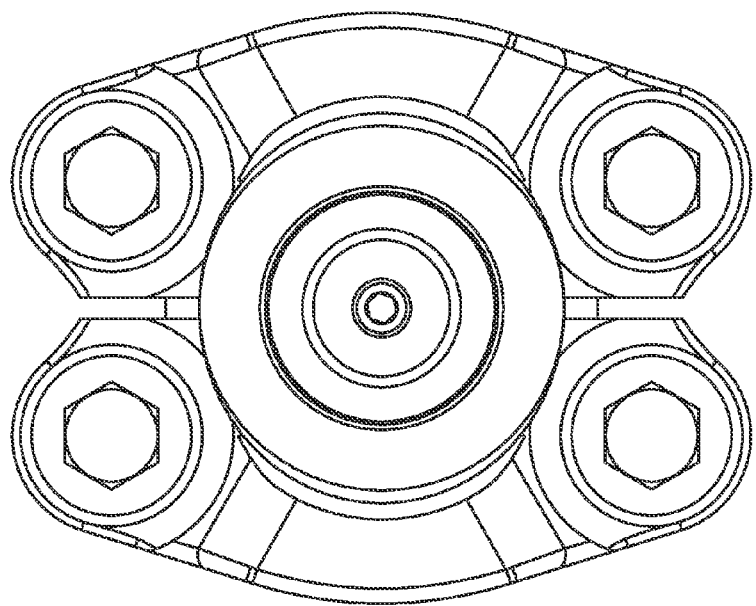
FIG. 35 illustrates a rear view of the embodiment of FIG. 32.

FIG. 35 illustrates a rear view of the embodiment of FIG. 32.

Figure 36:
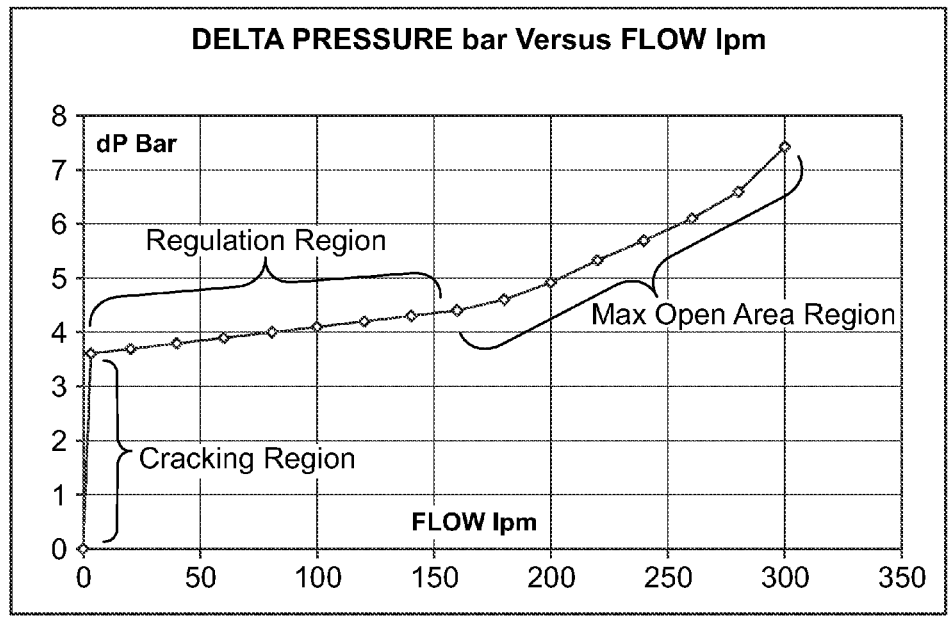
FIG. 36 illustrates a typical pressure drop versus flow characteristic curve with cracking region, regulation region and max open area region.

FIG. 36 illustrates a typical delta pressure (pressure drop measured in bar) versus flow (measured in 1 pm). The cracking region is pre-determined mainly by the spring preload and the slope of this region is mainly pre-determined by the presence of additional area passage holes in the disc. For example, a higher preload spring raises the pressure of the regulation region. Also for example, more open area increases the flow at the start of the regulation region. The regulation region slope is mainly predetermined by the spring rate. For example, a higher rate spring increases the slope of the regulation region. Finally the maximum open area region shows the pressure drop of the check valve at maximum open area. This is maximum open area region is mainly predetermined by the size of the check valve and the maximum check valve stroke. For example, the maximum open region is less steep for a larger check valve and for a larger maximum check valve stroke.

Figure 37:
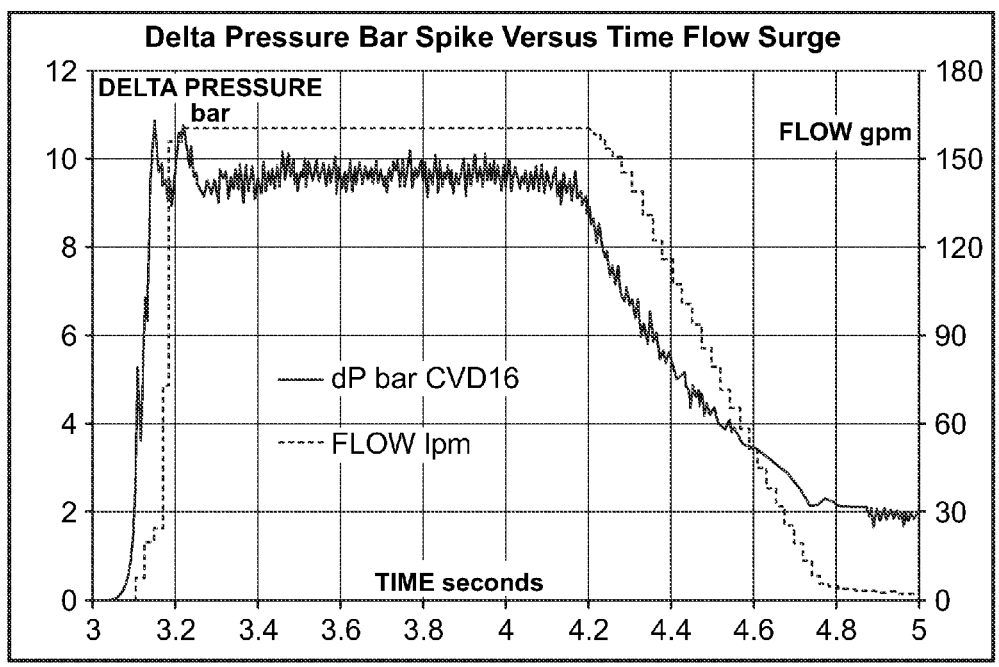
FIG. 37 illustrates a typical delta pressure spike versus time given a flow surge and shows low pressure overshoot.

FIG. 37 illustrates a typical delta pressure spike (bar) versus time (seconds) given an input flow surge. The dotted line shows the given flow surge versus time. This depends on the check valve application. The solid line show the delta pressure (inlet minus outlet pressure measured in bar) versus time (seconds). This delta pressure shows low pressure overshoot and few oscillation cycles.

Many hydraulic circuits use flexible hoses and ridged tubes with connecting fittings. Common types of conduit fittings include: 37 degree flare, O-ring face seal and 4 bolt flange. One or more embodiments of the present Disc Check Valve may be configured to be used with all these common types of conduit fittings and other types without special or added check body or fitting. For example, the O-ring Face Seal (ORFS) has a small face O-ring seal configured at the fitting abutment face. A thin adapter with a similar seal may be configured to insert this disc check between the ORFS fitting and abutment nut. The aperture hole is in this adapter. The disc may have a mismatched chamfer or radius to reduce leakage. Two stamped guide plates fit together with a slot. The front of these two plates may have slots that fit into groves in the disc. A back spring retainer may also have slots to hold the 90 degree angle between the guide plates. The spring retainer may have these slots angled such that there is a snap fit retention of the guide plates and the spring retainer. The guide plates may be stamped with relatively sharp edges. The spring ID is guided by the guide plates. The spring is on the main flow direction upstream side. This puts the spring loads on the guide plates in tension allowing the plates to be thin. Since these thin plates are aligned on both ends the guide function may be done with low mass parts.

The disc may be machined or forged such that has bending strength to resist high back pressure. The low mass allows stability and flow response in most circuit applications. The high strength disc allows a high back pressure rating.

Further, the parts may be clamped together with a center bolt. This bolt may have a seal to reduce back pressure leakage.

The abutment between the disc and adapter may have a known mismatched angled conical contact for low leakage in the closed position. This contact surface may also have radii configured for near zero leakage.

The nut that contact the two guide plates may have flats. This adds more guide plate angular alignment and allows the bolt to be tightened without the need for a wrench nor tool fixture to hold the nut. One or more of the configurations shown have the main flow direction INTO an ORFS fitting (not shown). The main flow direction may be indicated by arrows in the guide plates. This ORFS fitting typically has a seal so the seal on the adapter is on the face opposite the ORFS fitting, but is not required to be so. Other sealing methods such as coatings or metal to metal contact may be used. The thickness of the adapter typically reduces the ORFS thread engagement slightly. The addition of thread lock sealant may make up for the reduced thread engagement so the joint is leak free and does not come loose in normal application. The same parts may be assembled with main flow direction OUT of an ORFS fitting. This configuration has the adapter flipped 180 degrees. The spring force and rate are pre-determined for a cracking pressure and regulation curve. For example, the spring may be sized for low, medium and higher cracking pressures such as 1 psi, 5 psi and 65 psi or any other cracking pressure needed for an application. The spring rate may also vary to match the desired pressure versus flow characteristic curve. For example, the spring rate may be increased to increase the pressure regulation or slope of the pressure curve. Alternatively, the spring rate may be decreased to decrease the pressure regulation or slope of the pressure curve regulation region as shown in FIG. 36.

Alternatively, holes may be added in the disc if an orifice type flow is needed in the restricted flow direction. This typically, increases the flow at which the regulation region starts as shown in FIG. 36.

The check valve max open stroke may be pre-determined and set by an abutment surface on the guide plates. This max stroke abutment may be angled such that any deflection does not cause check motion stickiness or hysteresis. This max stroke position when increased may reduce the max delta pressure of the maximum open area region shown in FIG. 36.

The mass of this check valve system is relatively low as compared to other check valves. This low mass of the moving parts, tends to increase the natural frequency and reduce the pressure overshoot and number oscillations as shown by the pressure spike versus time trace given a large flow surge in FIG. 37.

Being able to assemble this disc check in existing ORFS lines avoids the cost of special check fittings.

Another type of hose connection is the 4-bolt joint. This disc check may be configured inside this type of hose and tube connection. Sometimes it is desirable for a check fitting to be included.

Still another type of hydraulic conduit is a 37 degree flare. This disc check may also be configured as an insert into those hoses and tubes and/or inside this type of hose fitting. For example, other types of hose connections include a beaded fitting and BSPP so called "G" port fittings. This disc check valve may be configured either inside these type fittings or inserted into the joint of these fittings as shown in previous configurations. This disc check may be configured inside a fitting or inside a manifold body (views not included).

This disc check may be used with oil, water, fuel, air or most any other fluid.

Alternatively, instead of a disc, the check valve may be in another shape such as cylindrical, spherical, oval, rectangular, square, or rhomboid.

Additionally, instead of a threaded screw, an alternative mechanical engagement system to engage the disc check valve to the guide plates may be employed. Alternatives include a riveted, welded, press-fit or adhesive connection.

Additionally, as described above, the check valve system may be configured inside fittings and manifolds as well as being inserted directly into common types of hose and tube joints avoiding additional fittings. Also, the guide plate retainer has a diametral deflection and/or press fit to engage said plurality of guide plates. Additionally, the insert adapter may be configured such that the check valve system can be inserted directly into hose and tube joints such as: ORFS (O-ring Face Seal), 37 Degree flare, 4-bolt joint and others so that the flow direction is into the hose or tube or the flow direction may be out of the hose or tube in respect to the check valve system.

In other embodiments, the check valve system may have the insert adapter as part of a fitting that is useful in hydraulic lines routing or as part of a manifold that is useful in hydraulic circuits. Also, the threaded screw may have a seal such as an O-ring and or other elastomeric seal with a seal groove and or chamfer added to the check valve and or sealant and or gasket added. Additionally, the check valve contact with said adapter has a low leakage provision such as a mismatched angle and or radius and or coating and or elastomeric seal. Also, the check valve shape may be cylindrical and or spherical, or oval, rectangular, square, or rhomboid. Additionally, the retaining nut may have slots to align said plurality of guide plates. Also, the retaining nut slots may have chamfers and or the guide plate retainer slots have chamfers and or check valve slots have chamfers to assist part engagement upon assembly. Additionally, the guide plate and or plates may have a flow direction indicator marking and or arrow stamped and or etched. Also, the insert adapter may include additional sealing elements such as an elastomeric seal and groove. Additionally, the threaded screw may have a thread locking provision added to the threaded screw and or retainer nut prior to the check valve system assembly to prevent thread loosening. Also, the threaded screw exposed threads may have a crimp operation added after the check valve system is assembled to prevent thread loosening. Additionally, the threaded screw threads engagement may be replaced with a braze and or rivot and or weld and or press fit and or adhesive connection method. Also, the plurality of guide plates may be replaced with a brazed and or welded and or molded complete guide plate assembly.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A check valve system including:
    a plurality of guide plates;
    a guide plate retainer engaging said plurality of guide plates and maintaining a position of said guide plates relative to each other;
    an insert adapter;
    a valve spring, wherein said valve spring produces a spring force between said guide plate retainer and said insert adapter;
    a check valve,
    a retainer nut;
    a threaded screw engaging said check valve and said retainer nut and causing said retainer nut to engage at least one of said plurality of guide plates;
    wherein said check valve contacts said insert adapter when said check valve is in a closed position preventing flow through said check valve system, and
    wherein said check valve is displaced from said insert adapter when said check valve is in an open position permitting flow through said check valve system.

2. The check valve system of claim 1 wherein said check valve is disc shaped.

3. The check valve system of claim 1 wherein said guide plate retainer includes a plurality of slots engaging said guide plates.

4. The check valve system of claim 3 wherein at least one of said slots includes a diametrical deflection.

5. The check valve system of claim 3 wherein said guide plate retainer may be press fit to engage said plurality of guide plates.

6. The check valve system of claim 1 wherein at a location where said check valve contacts said insert adapter, a surface of said check valve is configured at a first angle and a surface of said insert adapter is configured at a second angle different from said first angle.

7. The check valve system of claim 1 wherein said retaining nut includes at least one slot for use in aligning said plurality of guide plates.

8. The check valve system of claim 1 wherein at least one of said guide plates includes an indicator of expected flow direction.

9. The check valve system of claim 1 wherein an indicator of expected flow direction is stamped into said at least one of said guide plates.

10. A hydraulic connection check valve system, said hydraulic connection check valve system including:
    a check valve system including:
        a plurality of guide plates;

a guide plate retainer engaging said plurality of guide plates and maintaining a position of said guide plates relative to each other;

an insert adapter, wherein said insert adapter includes a tubing seal;

a valve spring, wherein said valve spring produces a spring force between said guide plate retainer and said insert adapter;

a check valve, a retainer nut;

a threaded screw engaging said check valve and said retainer nut and causing said retainer nut to engage at least one of said plurality of guide plates;

wherein said check valve contacts said insert adapter when said check valve is in a closed position preventing flow through said check valve system, and wherein said check valve is displaced from said insert adapter when said check valve is in an open position permitting flow through said check valve system;

a hydraulic connection fitting including:

a threaded exterior, wherein said check valve system is positioned in said hydraulic connection fitting so that said insert adapter contacts said hydraulic connection fitting; and tubing, wherein said tubing includes a tube thread that is threaded into said threaded exterior of said hydraulic connection fitting to seal said check valve system into said hydraulic connection fitting, wherein said tubing seal of said insert adapter forms a seal with said tubing.

11. The hydraulic connection check valve system of claim 10 wherein said check valve system is positioned in said hydraulic connection fitting to operate as a check valve for fluid flowing into said hydraulic connection fitting.

12. The hydraulic connection check valve system of claim 10 wherein said check valve system is positioned in said hydraulic connection fitting to operate as a check valve for fluid flowing out of said hydraulic connection fitting.

13. The hydraulic connection check valve system of claim 10 wherein said hydraulic connection fitting is an O-Ring face seal hydraulic connection fitting.

14. The hydraulic connection check valve system of claim 10 wherein said hydraulic connection fitting is a 37 degree flare hydraulic connection fitting.

15. The hydraulic connection check valve system of claim 10 wherein at least one of said guide plates includes an indicator of expected flow direction through said hydraulic connection fitting.

16. The hydraulic connection check valve system of claim 10 wherein said insert adapter is angled to conform to an exterior angle of said hydraulic connection fitting.

17. A check valve system including:

a plurality of guide plates;

a guide plate retainer engaging said plurality of guide plates and maintaining a position of said guide plates relative to each other;

an insert adapter;

a check valve, a retainer nut;

a threaded screw engaging said check valve and said retainer nut and causing said retainer nut to engage at least one of said plurality of guide plates;

wherein said check valve contacts said insert adapter when said check valve is in a closed position preventing flow through said check valve system, and wherein said check valve is displaced from said insert adapter when said check valve is in an open position permitting flow through said check valve system.

* * * * *